US012617165B2

(12) United States Patent (10) Patent No.: US 12,617,165 B2
Shan et al. (45) Date of Patent: May 5, 2026

(54) METHOD FOR PRINTING A THERMOPLASTIC FILM ON AN OPTICAL MOLD

(71) Applicant: Essilor International, Charenton-le-Pont (FR)

(72) Inventors: Haifeng Shan, Dudley, MA (US); Hao-Wen Chiu, Dudley, MA (US); Aref Jallouli, Dudley, MA (US)

(73) Assignee: Essilor International, Charenton-le-Pont (FR)

( * ) Notice: Subject to any disclaimer, the term of this patent is extended or adjusted under 35 U.S.C. 154(b) by 148 days.

(21) Appl. No.: 18/027,982

(22) PCT Filed: Sep. 27, 2021

(86) PCT No.: PCT/EP2021/076472
§ 371 (c)(1),
(2) Date: Mar. 23, 2023

(87) PCT Pub. No.: WO2022/064028
PCT Pub. Date: Mar. 31, 2022

(65) Prior Publication Data
US 2023/0364871 A1 Nov. 16, 2023

(30) Foreign Application Priority Data
Sep. 28, 2020 (EP) .................................... 20306110

(51) Int. Cl.
*B29D 11/00* (2006.01)
*B29C 71/02* (2006.01)
(Continued)

(52) U.S. Cl.
CPC ........ *B29D 11/00788* (2013.01); *B29C 71/02* (2013.01); *B29D 11/00432* (2013.01);
(Continued)

(58) Field of Classification Search
CPC ... B29C 64/118; B29C 64/245; B29C 64/112; B29C 64/386; B29C 64/393;
(Continued)

(56) References Cited

U.S. PATENT DOCUMENTS

2001/0038438 A1* 11/2001 Beeloo .................... B32B 27/36
264/1.32
2014/0291886 A1* 10/2014 Mark ..................... B33Y 10/00
264/259
(Continued)

FOREIGN PATENT DOCUMENTS

CN 105283301 1/2016
CN 110641010 1/2020
(Continued)

OTHER PUBLICATIONS

International Search Report and Written Opinion issued in corresponding PCT Application No. PCT/EP2021/076472, mailed Dec. 8, 2021.

*Primary Examiner* — Andrew L Swanson
(74) *Attorney, Agent, or Firm* — Norton Rose Fulbright US LLP

(57) ABSTRACT

The present disclosure relates to a method of printing a thermoplastic film on an optical mold comprising adjusting a temperature of the optical mold to a first temperature, printing a first layer of the thermoplastic film on the optical mold once the temperature of the optical mold has reached the first temperature, applying a vacuum to the optical mold to hold the thermoplastic film on the optical mold, adjusting the temperature of the optical mold to a second temperature, printing a second layer of the thermoplastic film on the first layer of the thermoplastic film once the temperature of the optical mold has reached the second temperature, adjusting the temperature of the optical mold to a third temperature, annealing the first layer and the second layer once the (Continued)

400 temperature of the optical mold has reached the third temperature, and removing the vacuum from the optical mold permitting removal of the thermoplastic film including the annealed first layer and the annealed second layer from the optical mold.

12 Claims, 10 Drawing Sheets

(51) Int. Cl.
*B29C 64/118* (2017.01)
*B29C 64/245* (2017.01)

(52) U.S. Cl.
CPC .... *B29D 11/0048* (2013.01); *B29D 11/00634* (2013.01); *B29C 64/118* (2017.08); *B29C 64/245* (2017.08); *B29C 2071/022* (2013.01)

(58) Field of Classification Search
CPC ......... B29C 71/02; B33Y 50/00; B33Y 50/02; B33Y 80/00; B29D 11/00788; B29D 11/00432; B29D 11/0048; B29D 11/00634
See application file for complete search history.

(56) References Cited

U.S. PATENT DOCUMENTS

| | | | | |
|---|---|---|---|---|
| 2017/0198104 | A1* | 7/2017 | Bheda | ................... B29C 48/022 |
| 2018/0345649 | A1* | 12/2018 | Prakash | ................ B29C 64/295 |
| 2019/0009456 | A1 | 1/2019 | Biskop | |
| 2019/0061248 | A1* | 2/2019 | Saito | .................... B29C 64/245 |
| 2019/0322047 | A1* | 10/2019 | Riha | ...................... B33Y 30/00 |
| 2020/0009654 | A1* | 1/2020 | Brzezinski | ............. B29C 64/40 |
| 2021/0362444 | A1* | 11/2021 | Totzeck | ................ G02C 7/061 |
| 2022/0339880 | A1* | 10/2022 | Yamazaki | .............. B22F 10/10 |

FOREIGN PATENT DOCUMENTS

| | | |
|---|---|---|
| EP | 3495128 | 6/2019 |
| EP | 3579044 | 12/2019 |
| WO | WO 2017/180958 | 10/2017 |
| WO | WO 2020/078964 | 4/2020 |

* cited by examiner

100

400

500

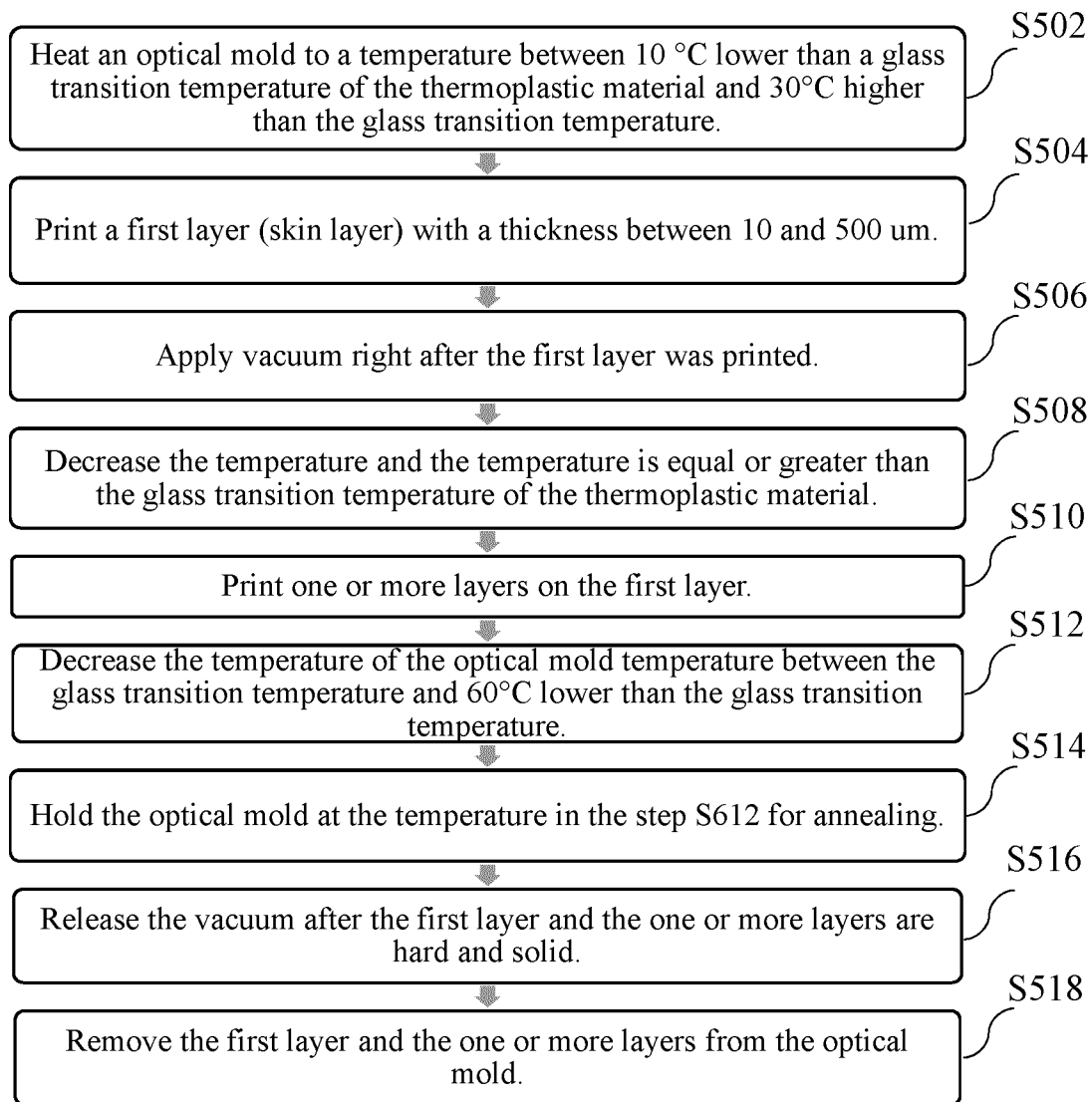

S502

Heat an optical mold to a temperature between 10 °C lower than a glass transition temperature of the thermoplastic material and 30°C higher than the glass transition temperature.

S504

Print a first layer (skin layer) with a thickness between 10 and 500 um.

S506

Apply vacuum right after the first layer was printed.

S508

Decrease the temperature and the temperature is equal or greater than the glass transition temperature of the thermoplastic material.

S510

Print one or more layers on the first layer.

S512

Decrease the temperature of the optical mold temperature between the glass transition temperature and 60°C lower than the glass transition temperature.

S514

Hold the optical mold at the temperature in the step S612 for annealing.

S516

Release the vacuum after the first layer and the one or more layers are hard and solid.

S518

Remove the first layer and the one or more layers from the optical mold.

METHOD FOR PRINTING A THERMOPLASTIC FILM ON AN OPTICAL MOLD

CROSS-REFERENCE TO RELATED APPLICATIONS

This application is a national phase application under 35 U.S.C. § 371 of International Application No. PCT/EP2021/076472 filed 27 Sep. 2021, which claims priority to European Patent Application No. 20306110.6 filed 28 Sep. 2020. The entire contents of each the above-referenced disclosures is specifically incorporated by reference herein without disclaimer.

BACKGROUND

Field of the Disclosure

The present disclosure relates to method for printing a thermoplastic film on an optical mold.

Description of the Related Art

Ophthalmic lens products are regularly comprised of a lens and a film, and the film is typically laminated on an optical surface of the lens. The film can be a thin and flat wafer. The thin and flat wafer comprising thermoplastic films can be printed by an additive manufacturing three-dimensional (3D) printer for ophthalmic lens applications. However, when printing the thin and flat wafer, some issues may exist due to limited force and heat during the printing processes, e.g., voids between thermoplastic filament strands and layers, poor adhesion between thermoplastic filament strands and between layers, film warpage, and rough surfaces, etc.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

Aspects of the invention may address some of the above-described shortcomings in the art, particularly using solutions set forth in the claims.

SUMMARY

The present disclosure relates to a method of printing a thermoplastic film on an optical mold.

The present disclosure further relates to a method of printing a thermoplastic film on an optical mold, comprising adjusting, by temperature control circuitry, a temperature of the optical mold to a first temperature, printing a first layer of the thermoplastic film on the optical mold once the temperature of the optical mold has reached the first temperature, applying a vacuum to the optical mold to hold the thermoplastic film on the optical mold, adjusting, by the temperature control circuitry, the temperature of the optical mold to a second temperature, printing a second layer of the thermoplastic film on the first layer of the thermoplastic film once the temperature of the optical mold has reached the second temperature, adjusting, by the temperature control circuitry, the temperature of the optical mold to a third temperature, annealing the first layer and the second layer once the temperature of the optical mold has reached the third temperature, and removing the vacuum from the optical mold permitting removal of the thermoplastic film including the annealed first layer and the annealed second layer from the optical mold, wherein the first temperature may be between 10° C. lower than a glass transition temperature of the thermoplastic film and 30° C. higher than the glass transition temperature, the first layer of the thermoplastic film may be a thermoplastic skin layer including a plurality of thermoplastic layers, a thickness of the first layer of the thermoplastic film may be between 10 and 500 microns, the second temperature may be equal or greater than the glass transition temperature, the third temperature may be between the glass transition temperature and 60° C. lower than the glass transition temperature, the temperature control circuitry may control one or more electric heating elements and/or a microfluidic channel circulating with a temperature regulating fluid to regulate the temperature of the optical mold, the printing the first layer or printing the second layer includes printing using a single thermoplastic or at least two different thermoplastics to form 2D or 3D structures and/or functions, at least one of the at least two different thermoplastics may have a higher mechanical strength than another one of the at least two different thermoplastics and/or at least one of the at least two different thermoplastics may have a higher glass transition temperature than another one of the at least two different thermoplastics, the at least two different thermoplastics form a homogenous or heterogeneous structures and/or functions, the at least two different thermoplastics may form a heterogeneous structures and/or function, wherein AF between different thermoplastics may be less than 1, where $$\Delta E = \sqrt{(\Delta L)^2 + (\Delta a^*)^2 + (\Delta b^*)^2},$$

as defined by CIE76 formula, the at least two different thermoplastics are modifiable with light filters or dyes or additives or fillers, wherein the light filters may include one from a group consisting of UV absorber, blue cut filter, and NIR cut filter, wherein the dyes may include one from a group consisting of color balancing dyes, color enhancement dyes, photochromic dye, and dichroic dyes, wherein the additives may include one from a group consisting of plasticizer, heat stabilizer, light stabilizer, flow improver, and mold release agent, and wherein the fillers may include one from a group consisting of particles, fibers, and nano tubes.

The present disclosure further relates to a thermoplastic film of an ophthalmic lens formed on an optical mold, comprising a first layer of the thermoplastic film formed on the optical mold, wherein a temperature of the optical mold may be adjusted to a first temperature during the formation of the first layer of the thermoplastic film, and a second layer of the thermoplastic film formed on the first layer, wherein the temperature of the optical mold may be adjusted to a second temperature during the formation of the second layer of the thermoplastic film. The thermoplastic film of an ophthalmic lens may further comprise one or more of optical surface features including spheric, aspheric, bifocal, trifocal, progressive, microlenses, Fresnel structures, and moth-eye structures.

The present disclosure further relates to an optical mold structure for forming a thermoplastic film, comprising temperature control circuitry, the temperature control circuitry controlling one or more electric heating elements and/or a microfluidic channel, an optical mold on the temperature control circuitry for forming a first layer and a second layer of the thermoplastic film, wherein the optical mold further comprising one or more of optical surface features including spheric, aspheric, bifocal, trifocal, progressive, microlenses, Fresnel structures, and moth-eye structures, and a vacuum attaching to the optical mold for holding the thermoplastic film on the optical mold.

The present disclosure further relates to an optical mold structure for forming a thermoplastic film, comprising temperature control circuitry, the temperature control circuitry controlling one or more electric heating elements and/or a microfluidic channel, an optical mold on the temperature control circuitry for forming a first layer and a second layer of the thermoplastic film, and a vacuum attaching to the optical mold for holding the thermoplastic film on the optical mold.

The foregoing paragraphs have been provided by way of general introduction, and are not intended to limit the scope of the following claims. The described features, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a method of printing thermoplastic layers or a thermoplastic product formed on an optical mold, within the scope of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Unless indicated otherwise, the features and embodiments described herein are operable together in any permutation.

The terms "about" and "approximately" are defined as being close to as understood by one of ordinary skill in the art.

The process of the present disclosure can "comprise," "consist essentially of," or "consist of" particular ingredients, components, compositions, etc., disclosed throughout the specification.

The present disclosure describes a method of printing a thermoplastic film, e.g., a thin and curved wafer, on an optical mold for the ophthalmic lens application. The method may improve the optical clarity, mechanical strength, optics accuracy, while avoiding warpage and rough surfaces.

The present disclosure discloses a method of a thermoplastic film of an ophthalmic lens formed on an optical mold, e.g., a thin and curved wafer. For example, the thermoplastic film may be formed as a thin and curved wafer on the ophthalmic lens. Accordingly, the method may provide a better quality of the thermoplastic film for the ophthalmic lens.

Figure 1:
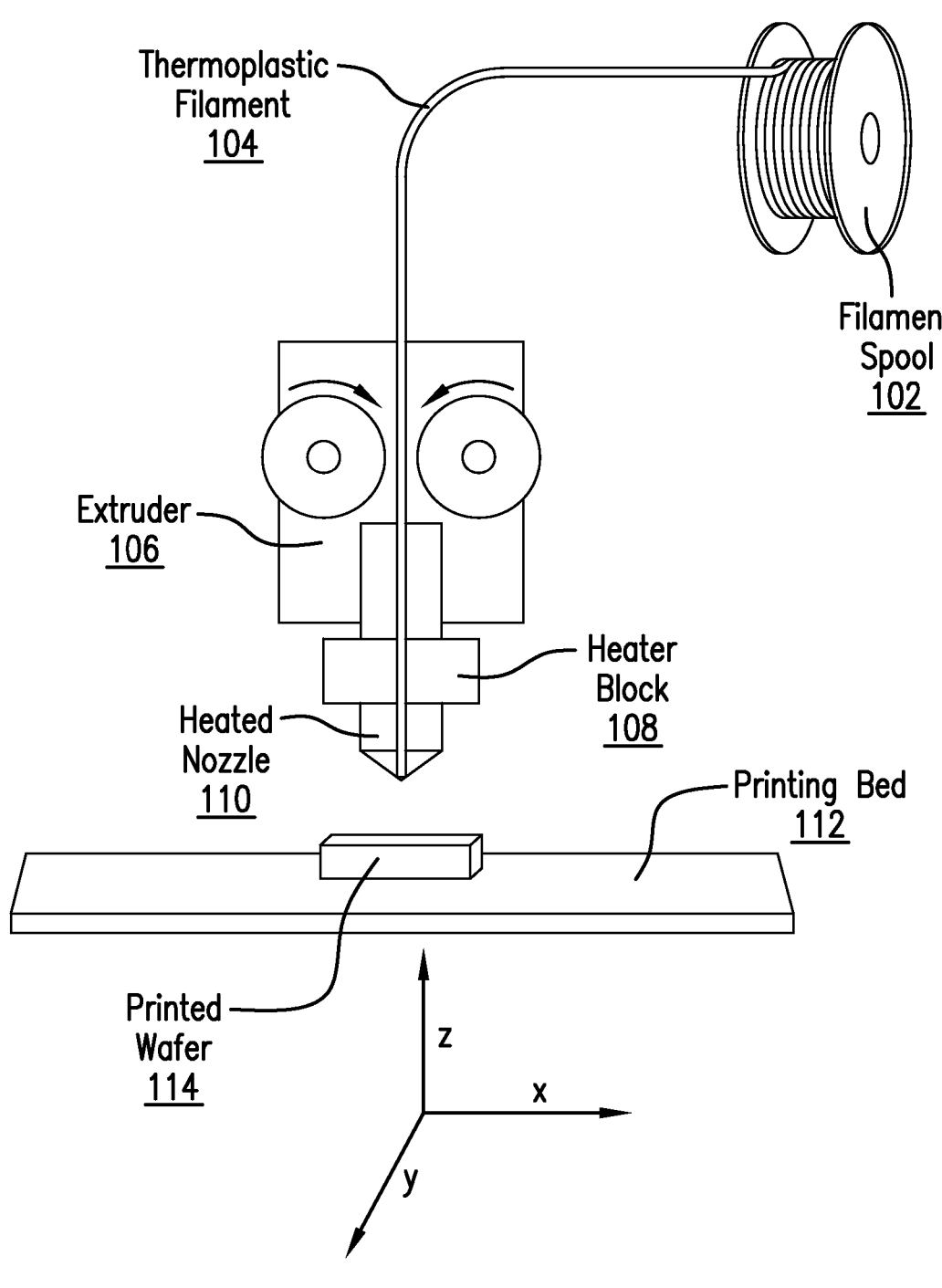
FIG. 1 is an illustration of a three-dimensional fused deposition modeling (FDM) printer, within the scope of the present disclosure.

Turning now to the figures, FIG. 1 shows an exemplary three-dimensional fused deposition modeling (FDM) process useful within the scope of the present disclosure.

One or more thermoplastic filaments 104 may be pulled from a filament spool 102. The thermoplastic filaments 104 may pass through the extruder 106 and then may pass through the heater block 108 to the heated nozzle 110. The melted thermoplastic filaments 104 may be then extruded onto a printing bed 112 in an X-Y axis direction, where hot strands may be laid down side by side. Once a first layer may be completed, the printing bed 112 may be lowered in a Z axis direction (or the nozzle is raised in the Z axis direction) and a second layer may be then deposited. The above steps may be repeated until a whole structure or a whole stack of layers 114 may be finished. These hot strands may be welded together when they are still in a molten state, and then cooled down to form a solid structure or a stack of layers.

With reference to Table 1, some exemplary commercial three-dimensional fused deposition modeling printers, along with their heating capability, are listed within the scope of the present disclosure.

Depending on printer design, some printing beds 112 in FIG. 1 may be heated, but may be heated only to a limited temperature. For example, the printing bed 112 may be heated only until 140° C. by Ultimaker S5 as shown in Table 1. In addition, the printing may also be performed inside an enclosed chamber, which may be heated to a certain temperature. For example, the printing bed 112 may be heated until 70° C. by PartPro300 xT as shown in Table. 1. Some printers may have a heated chamber and the heated chamber may be heated up to 80° C., e.g., Roboze One +400. After the printing finishes, parts, e.g., the printed layers or structure may be generally cooled down under ambient conditions to form a solid part.

TABLE 1

| | List of FDM 3D printers with heating capability. | | | | |
|---|---|---|---|---|---|
| Model | Dual TP extrusion (Yes/No) | Closed Chamber (Yes/No) | Heated chamber (Yes/No) | Build Plate's maximum temperature | Nozzle's maximum temperature |
| Ultimaker S5 | Yes | Yes | No | 140° C. | 280° C. |
| Roboze One + 400 | No | Yes | Yes, 80° C. | 130° C. | 450° C. |
| Lulzbot TAZ 6 | Yes | Yes | No | 120° C. | 290° C. |
| PartPro300 xT | Yes | Yes | Yes, 70° C. | 100° C. | 350° C. |
| Rize One | No | Yes | Yes | Heated | 275° C. |

Figure 2A:
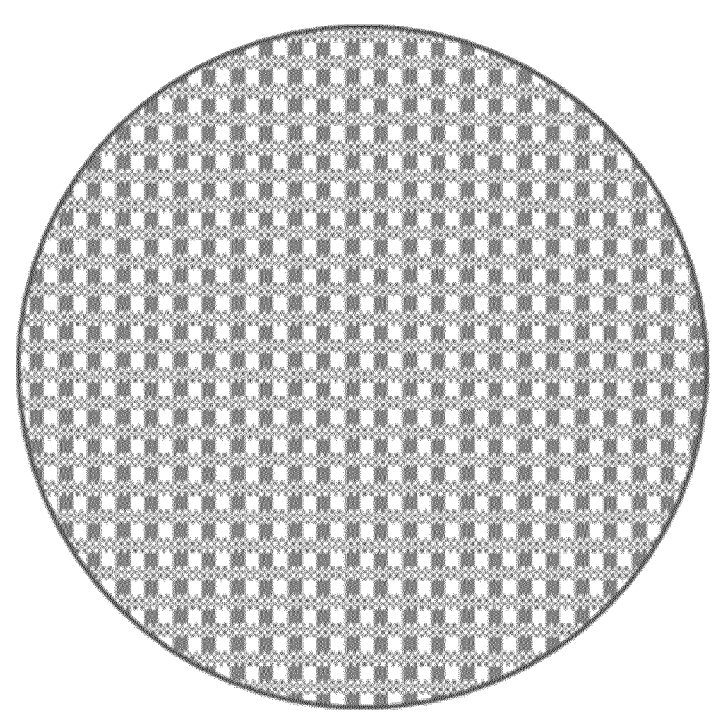
FIG. 2A is a top view of a thin flat wafer printed by the three-dimensional fused deposition modeling printer, within the scope of the present disclosure.
Figure 2B:
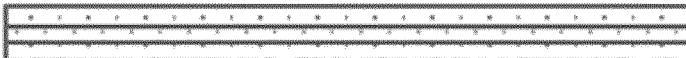
FIG. 2B is a side view of the thin flat wafer printed by the three-dimensional fused deposition modeling printer, within the scope of the present disclosure.

With reference to FIGS. 2A and 2B, an exemplary top view of a thin flat wafer printed by the three-dimensional fused deposition modeling printer described above may be shown in FIG. 2A within the scope of the present disclosure. An exemplary side view of the thin flat wafer may be shown in FIG. 2B within the scope of the present disclosure.

Several issues exist for the 3D FDM printing, for example, the issues may include the existence of voids between filament strands and layers of the thermoplastic filaments 104, poor adhesion between filament strands and between layers of the thermoplastic filaments 104, warpage of the printed wafer 114, and rough surfaces of the printed wafer 114. These issues may be mainly due to limited force and heat that may be applied by the three-dimensional fused deposition modeling printing process comparing the three-dimensional fused deposition modeling printing process with conventional manufacturing processes, e.g., injection molding, compression molding, etc., the force in the three-dimensional fused deposition modeling printing process may be much less than in the conventional manufacturing processes and the heat may be less well controlled in the three-dimensional fused deposition modeling printing process than in the conventional manufacturing processes Thus, the films or layers printed by the three-dimensional fused deposition modeling printing process may usually have the following shortcomings: poor optical properties, poor mechanical strength, and poor dimension accuracy. In particular, the poor mechanical strength may be caused by poor adhesion between filament strands and between layers.

Figure 3A:
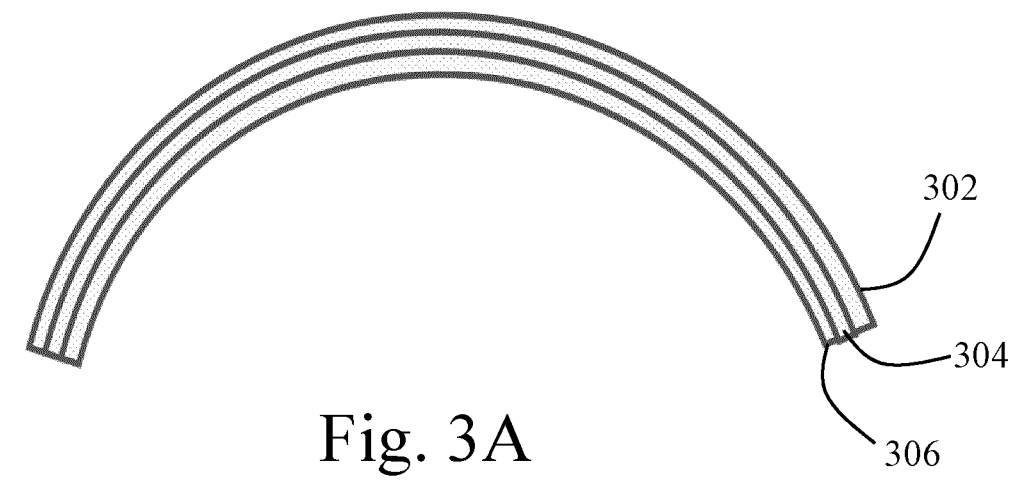
FIGS. 3A, 3B and 3C are side views of different thin curved wafers for ophthalmic lens, within the scope of the present disclosure.

With reference to FIGS. 3A, B, and C, side views of different thin curved wafers for ophthalmic lens may be listed.

With reference to FIG. 3A, an exemplary cross-sectional thin spherical wafer on an ophthalmic lens may be shown within the scope of the present disclosure. The thin spherical wafer includes three layers of thermoplastic films 302, 304, and 306 printed by the system 100 illustrated earlier in FIG. 1. The thin spherical wafer may be integrated into the ophthalmic lens. However, there are some issues to be solved, such as high surface roughness, high haze value, low dimension accuracy, low surface curvature accuracy, and low surface replication rate. In order to achieve low optical shift, the thin wafer in FIG. 3A should be printed as accurate as possible so that the spherical surface may be achieved.

Figure 3B:

With reference to FIG. 3B, an exemplary cross-sectional thin curved wafer with an optical design on the top surface 308 may be shown within the scope of the present disclosure. The thin curved wafer includes three layers of thermoplastic films 308, 310, and 312 printed by the system 100 illustrated earlier in FIG. 1. Optical power may be calculated in the optical design of the thin curved wafer and the surface curvature should match the optical design. The surface may include a spherical surface, an aspherical surface, a cylindrical surface, or a progressive curved surface.

Figure 3C:
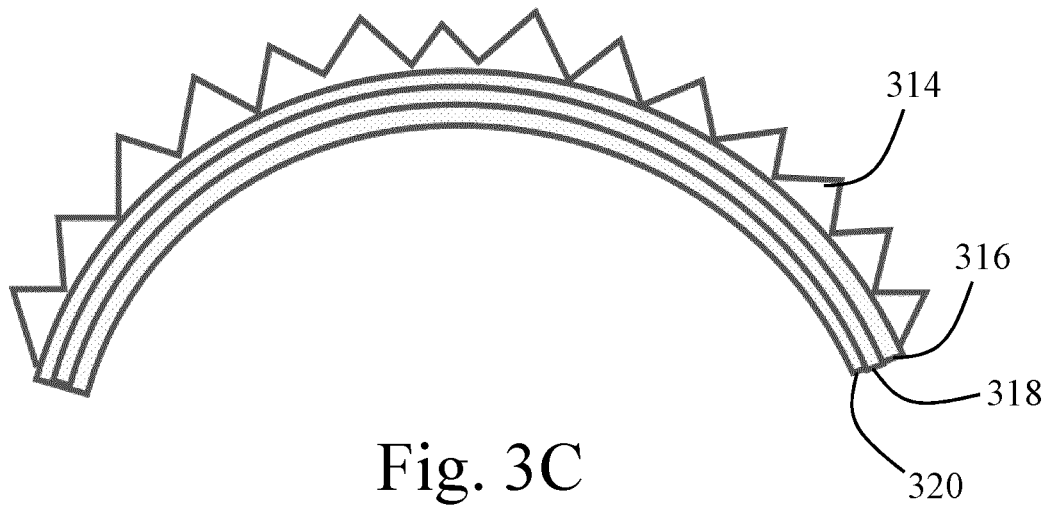

With reference to FIG. 3C, a cross-sectional thin curved wafer with a micro-structured front surface 314 is illustrated. The thin curved wafer may include four layers of thermoplastic films 314, 316, 318, and 320 printed by the system 100 illustrated earlier in FIG. 1. For a front surface with microstructures similar to the curved wafer in FIG. 3C, the replication of the front surface may be important, thus a method to form a micro-structured front surface on the thin curved wafer may be needed.

Figure 4:
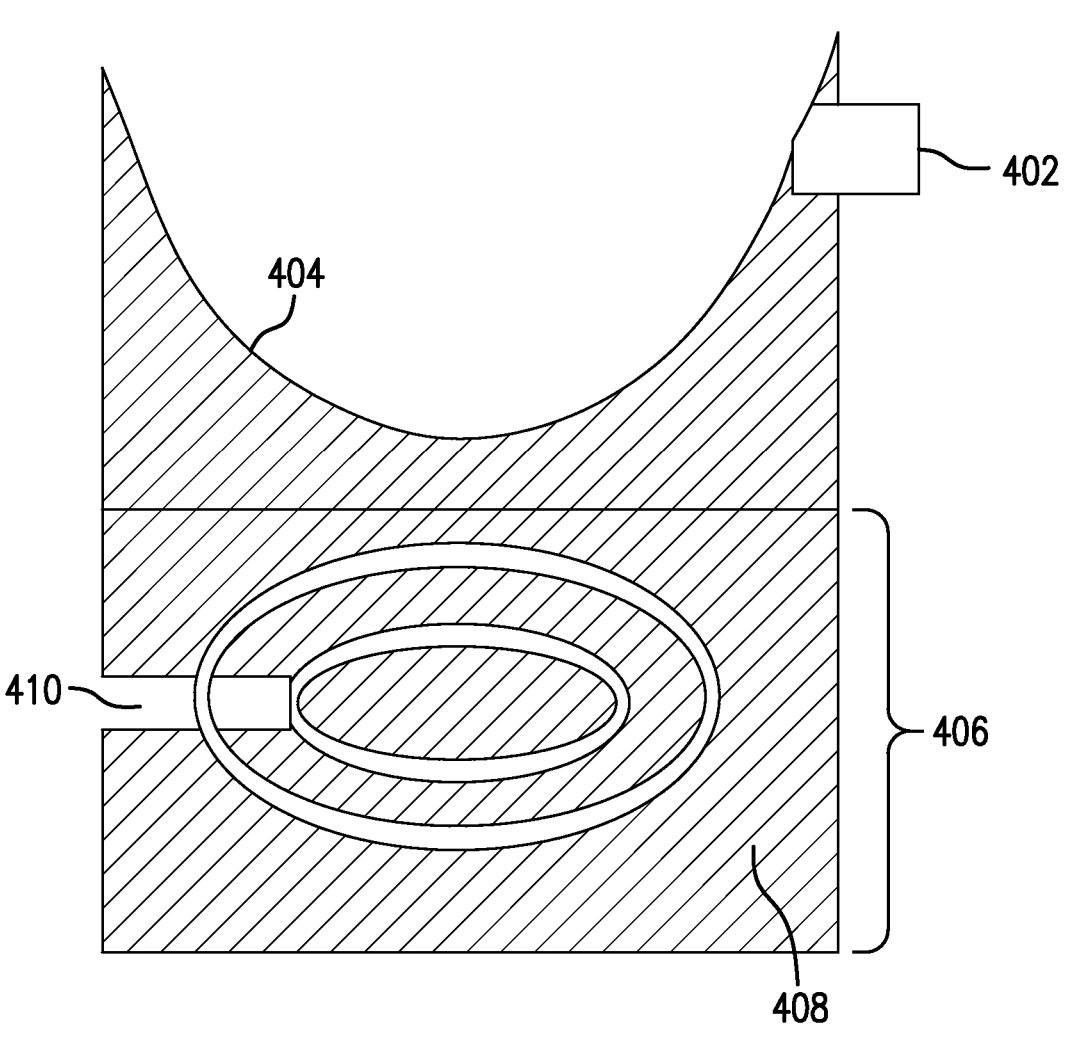
FIG. 4 is an illustration of a side view of an optical mold with temperature control circuitry for the three-dimensional FDM printing, within the scope of the present disclosure.

With reference to FIG. 4, an exemplary side view of an optical mold with temperature control circuitry for the three-dimensional FDM printing may be shown within the scope of the present disclosure.

The optical mold structure 400 may include a vacuum 402, an optical mold 404, and temperature control circuitry 406. The temperature control circuitry 406 may include a temperature control housing 408, and a microfluidic channel 410 as shown in FIG. 4. The surface of the optical mold 404 may have a small opening inlet. The opening inlet may connect to a vacuum suction 402, and the vacuum suction 402 may be applied to hold down and apply force onto any film, e.g., a thermoplastic film, during a printing process. The optical mold 404 may have a highly polished surface which is suitable for a thermoplastic film to be printed to create a high quality thermoplastic film for an optical design. The temperature control circuitry 406 may use the microfluidic channel 410 to adjust a temperature of the temperature control housing 408 and to further control a temperature of the optical mold 404 for heating or cooling.

The surface of the optical mold 404 may be a smooth surface. The smooth surface may be, but is not limited to, a curvature of spherical surface or aspherical surface. The smooth surface may also have, but not limited to, optical designs for a progressive lens, a bifocal lens, or a trifocal lens. The optical mold 404 may have a radius between 10-1000 mm.

The surface of the optical mold 404 may be a surface with microstructures. The microstructures may be, but are not limited to, microlens, Fresnel lens, or moth eyes. The microlens microstructure may be for myopia control. The Fresnel lens microstructure may be used for adjusting optical power of the ophthalmic lens. The moth eyes microstructure may provide one or more features such as antireflection and anti-fog.

The temperature control circuitry 406 may include a temperature control housing 408, and a microfluidic channel 410. The temperature control circuitry 406 may be used to control the temperature of the optical mold 404. For example, during a printing process, the temperature control circuitry 406 may control the temperature of the optical mold 404 to be heated above a glass transition temperature of the thermoplastic materials for printing in order to keep the printed thermoplastic materials in a softened state. Keeping the thermoplastic materials in the softened state may be beneficial since a replication quality of the mold surface curvature and the microstructures may be improved and the interlayer diffusion and the adhesion of the thermoplastic layers may also be improved. In another arrangement, after the printing process, the temperature control circuitry 406 may control the temperature of the optical mold 404 to be cooled down slowly until the temperature reaches 20° C. to 40° C. below the glass transition temperature of the thermoplastic materials or until the printed thermoplastic layers are solidified or hard enough so that the thermoplastic layers may be removed and remain the shape without warpage.

The opening inlet may connect to a vacuum suction 402. The opening inlet with the vacuum suction 402 may be used for applying vacuum or airflow. For example, vacuum may be applied after finishing printing a first thermoplastic film in a printing process. The vacuum may be used to hold first thermoplastic film, e.g., a wafer, to deform the wafer to match the mold surface curvature, and/or microstructures. In another arrangement, cool air, e.g., 10° C. to 30° C., may be applied after the printing process. The cool air may be used to reduce adhesion between the wafer and the optical mold 404 and then to remove wafer easily and quickly.

With reference to FIG. 5, an exemplary method of printing thermoplastic layers or a thermoplastic product formed on an optical mold is shown within the scope of the present disclosure. The method 500 may be achieved by, first, at step S502, heating an optical mold 404, as shown previously in FIG. 4, to a temperature between 10° C. lower than a glass transition temperature of the thermoplastic material and 30° C. higher than the glass transition temperature, e.g., 5° C. lower than a glass transition temperature of the thermoplastic material and 20° C. higher than the glass transition temperature, 5° C. lower than a glass transition temperature of the thermoplastic material and 10° C. higher than the glass transition temperature, 5° C. lower than a glass transition temperature of the thermoplastic material and 1° C. higher than the glass transition temperature, or 1° C. lower than a glass transition temperature of the thermoplastic material and 1° C. higher than the glass transition temperature.

At S504, a first layer of the thermoplastic films may be printed. The first layer may be a skin layer and the skin layer may include one or more thermoplastic layers. The first layer may be made by melting the thermoplastic filaments and extruding the melted filaments onto the optical mold 404, where the melted filaments may lay onto the optical mold 404 as hot strands. The hot strands may be then laid down side by side on the optical mold 404.

At S506, vacuum may be applied right after the first layer was printed. The vacuum may be used to hold the optical mold 404 and to deform the first layer to conform to the curvature or microstructures of the surface of the optical mold 404.

At S508-S510, the temperature of the optical mold 404 may be decreased such that the temperature may be equal or greater than the glass transition temperature of the thermoplastic material. The one or more layers on the first layer may be then printed. The one or more layers may thereby be printed with good adhesion between the strands and between the layers, and with good mechanical integrity to maintain a dimension accuracy and stability.

At S512, the temperature of the optical mold temperature may be decreased to between the glass transition temperature and 60° C. lower than the glass transition temperature, e.g., the glass transition temperature and 50° C. lower than the glass transition temperature, the glass transition temperature and 40° C. lower than the glass transition temperature, the glass transition temperature and 30° C. lower than the glass transition temperature, the glass transition temperature and 20° C. lower than the glass transition temperature, or the glass transition temperature and 10° C. lower than the glass transition temperature.

At S514, the optical mold 404 may be held at the temperature in the step S512 for annealing. The annealing at this temperature may remove the stress during the printing process.

At S516-S518, the vacuum may be released after the first layer and the one or more layers may be thereafter hard and solid. Cool air, e.g., from 10° C. to 30° C., from 10° C. to 20° C., from 15° C. to 30° C., or from 15° C. to 20° C., may be applied to help to cool down the optical mold 404 and the first layer and the one or more layers. The first layer and the one or more layers may be then removed from the optical mold 404 after the first layer and the one or more layers are solid and hard.

Figure 6:
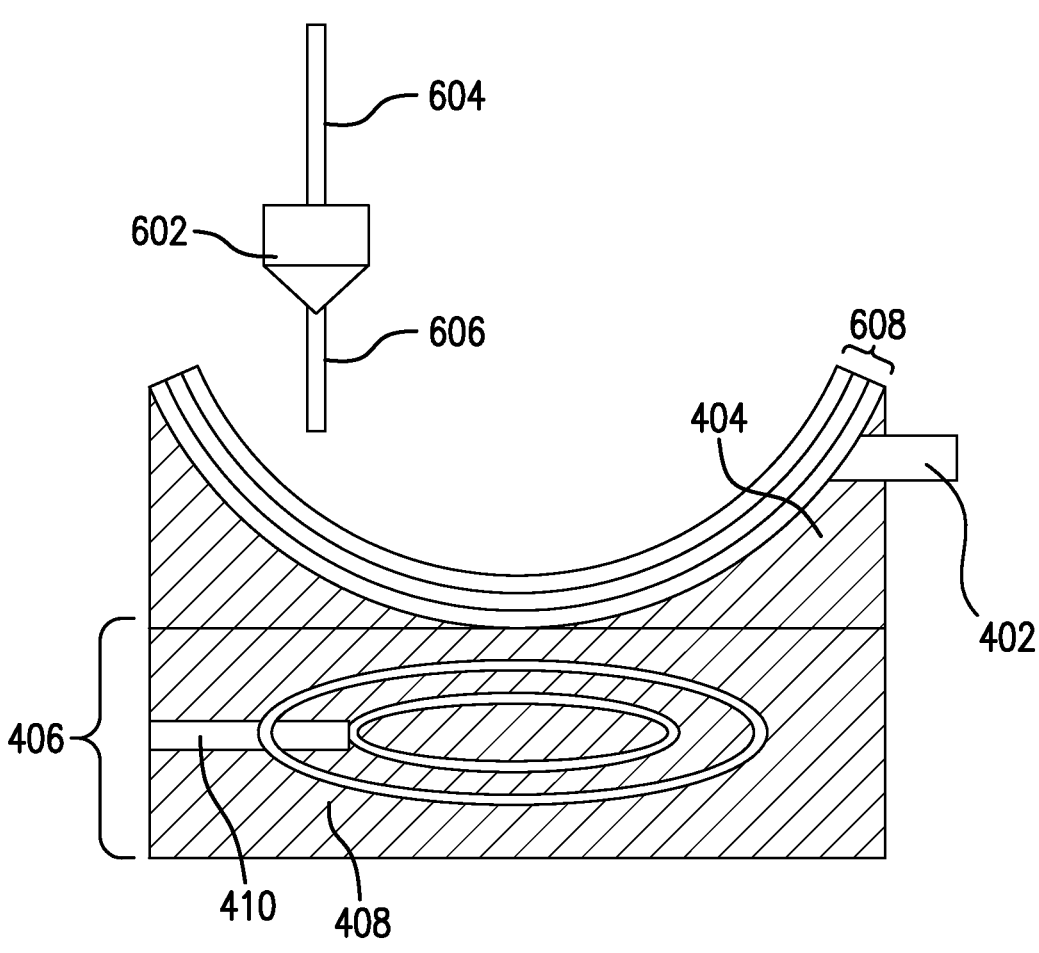
FIG. 6 is an illustration of an optical mold heated by the temperature control circuitry, within the scope of the present disclosure.

With reference to FIG. 6, an exemplary optical mold 404 heated by the temperature control circuitry 406 may be shown within the scope of the present disclosure. A nozzle 602 may be heated and the thermoplastic filaments 604 may be heated to be hot thermoplastic filaments 606. The hot thermoplastic filaments 606 may then be extruded from the nozzle 602. As described earlier in FIG. 4, the optical mold 404 may be heated or cooled by the temperature control circuitry 406. The temperature control unit 406 may have a temperature control housing 408 and the microfluidic channel 410.

The thermoplastic filaments or three-dimensional thermoplastic filaments may be produced by extrusion from the nozzle 602. The process may start with the thermoplastic pellets fed through a feeder into a hopper on the extruder or nozzle 602. The thermoplastic pellets may be then melted and extruded through a single hole die into a monofilament. A melted pump may be added between the die and a single extruder for a high precision flow rate control. The monofilament may be then pulled through a water or air bath. In addition, the diameter of the thermoplastic filaments may be adjusted by a ratio of melt flow rate and the filament winding speed.

The three-dimensional printer may be, but not limited to, MakerGear M2, Ultimaker S5, PartPro300 Xt, Rize One, Orboze one, Lulzbot TAZ 6, Stratasys F170, F270, F370, etc.

Figure 7A:
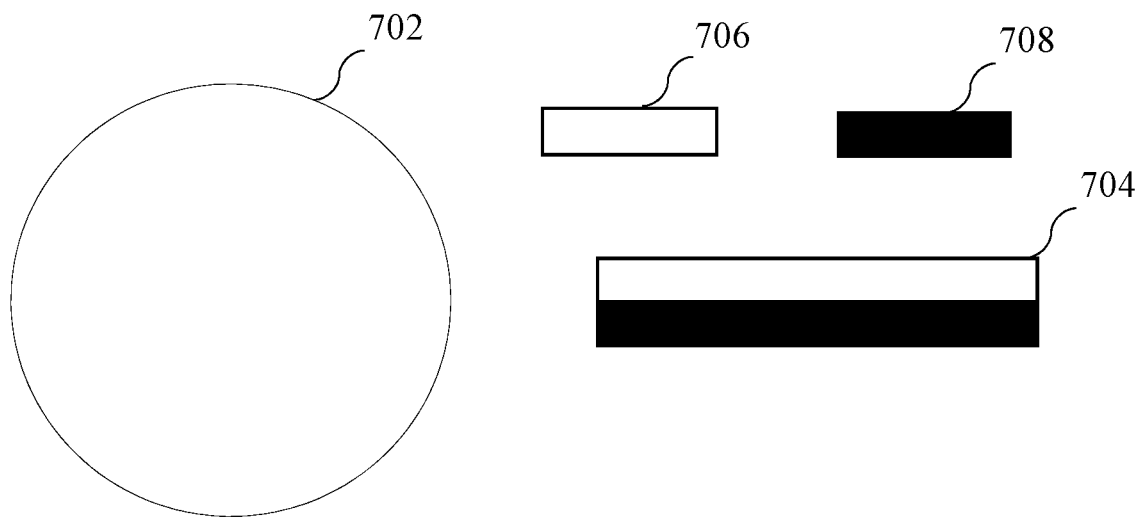
FIGS. 7A and 7B are illustrations of multiple thermoplastic layers printed on the optical mold, within the scope of the present disclosure.
Figure 7B:
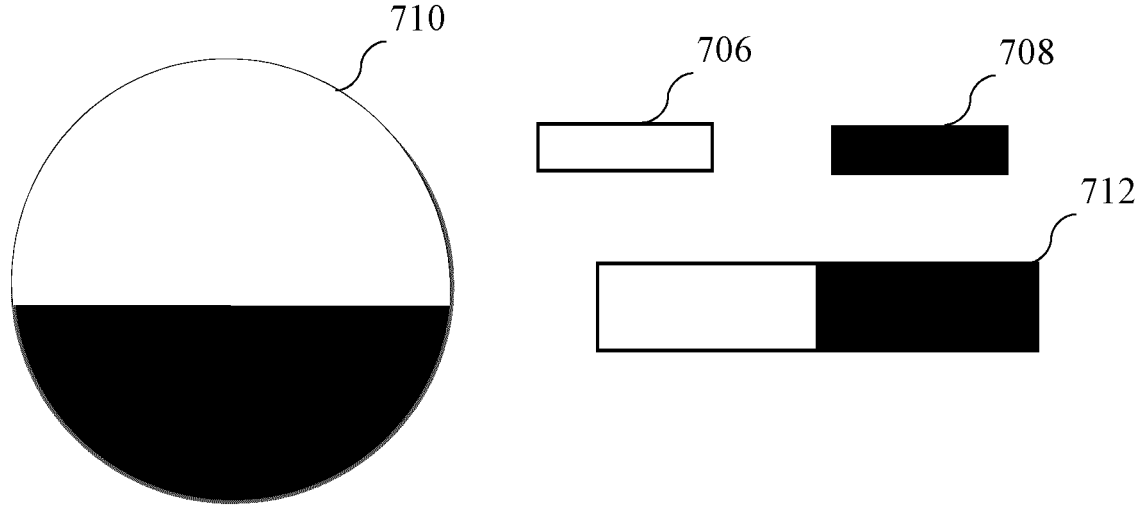

During a three-dimensional FDM printing process of the thermoplastic layers or films, the optical mold 404 may be heated to be at a temperature between 10° C. lower than a glass transition temperature of the thermoplastic material and 30° C. higher than the glass transition temperature. The microfluidic channel 410 may be injected with hot fluid at a temperature between 10° C. lower than a glass transition temperature of the thermoplastic material and 30° C. higher than the glass transition temperature, so that the temperature control circuitry 406 may be heated. Then the optical mold 404 is heated to the desired temperature. The heated filaments 606 may be then laid onto the optical mold to form layers of the thermoplastic films or products 608 while the optical mold 404 has a temperature between 10° C. lower than a glass transition temperature of the thermoplastic material and 30° C. higher than the glass transition temperature. As described earlier in FIG. 6, keeping the optical mold at this temperature is beneficial for improving the adhesion between thermoplastic strands on the optical mold 404 and improving the mechanical integrity to maintain a dimension accuracy and stability, and to replicate mold surface at high definition With reference to FIGS. 7A and 7B, exemplary multiple thermoplastic layers printed on the optical mold may be shown within the scope of the present disclosure. The multiple thermoplastic layers may be printed on a same layer or on different layers. The multiple thermoplastic layers may be used to form two-dimensional or three dimensional structures as illustrated in FIGS. 7A and 7B. Different structures may be used for improved optical functions or optical properties. For example, in FIG. 7A, a printed wafer with a homogenous thermoplastic structure is illustrated. A top view of the printed wafer is illustrated in 702. A side view of the printed wafer is illustrated in 704. The printed wafer 702 may include a top film which has a first thermoplastic material 706. The printed wafer 704 may also include a bottom film which has a second thermoplastic material 708.

The first thermoplastic material 706 may be used to print a functional layer of a final product. The layer printed by the first thermoplastic material 706 may be used with one or more functions. The functions may include, but are not limited to, tintability, anti-fog, anti-static, anti-scratch, anti-smudge, anti-reflection, sunwear, photochromic, or light filtration. The second thermoplastic material 708 may be used to print a substrate layer of the final product. The layer printed by the second thermoplastic material 708 may have the following properties: a higher mechanical strength, a higher glass transition temperature, and a better compatibility with a lens substrate. The combination of the first thermoplastic material and the second thermoplastic material in the printed layers may form the homogeneous structures as illustrated in FIG. 7A.

In FIG. 7B, another printed wafer with a homogeneous thermoplastic structure is illustrated. A top view of the printed wafer is illustrated in 710. A side view of the printed wafer is illustrated in 712. The printed wafer 712 may include a film on the left side which has a first thermoplastic material 706. The printed wafer 704 may also include a film on the right side which has a second thermoplastic material 708.

Figures 8A, 8B, 8C:
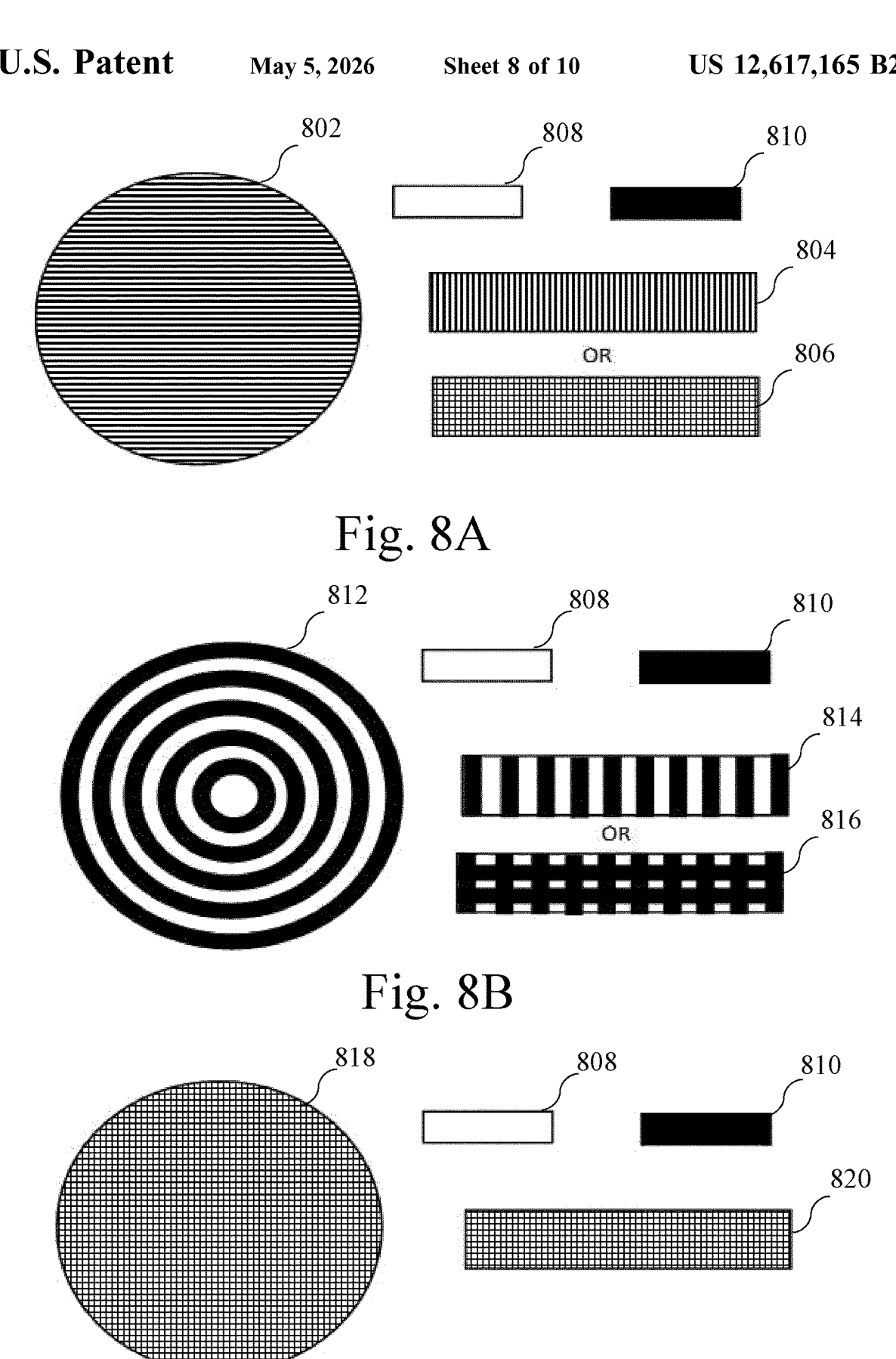
FIGS. 8A, 8B and 8C are illustrations of heterogeneous structures formed by a combination of the first thermoplastic material and the second thermoplastic material in the printed layers, within the scope of the present disclosure.

The combination of the first thermoplastic material and the second thermoplastic material in the printed layers may form the heterogeneous structures as illustrated in FIGS. 8A, 8B, and 8C. During the formation of the heterogeneous structures, some conditions may need to be considered. The first condition may be that the difference of refractive index (RI) between the first thermoplastic material and the second thermoplastic material should be less than 0.01. The difference of the RI less than 0.01 may avoid the light scattering. The second condition may be that the modulus (E) between the first thermoplastic material and the second thermoplastic material should be less than 1. The modulus between the first thermoplastic material and the second thermoplastic material less than 1 may avoid the color heterogeneity. The difference of the modulus (ΔE) of these two thermoplastic materials may be calculated as the function below:

$$\Delta E = \sqrt{(\Delta L)^2 + (\Delta a^*)^2 + (\Delta b^*)^2},$$

as defined by CIE76 formula, the CIE 76 formula is the formula relating to color difference to a set of CIELAB coordinates.

In FIG. 8A, a printed wafer with a heterogeneous thermoplastic structure is illustrated. A top view of the printed wafer is illustrated in 802. A side view of the printed wafer is illustrated in 804 and 806. The printed wafer 802 may include a structure with horizontal stripes which a first thermoplastic material 808 and a second thermoplastic material 810 may be connected to each other. The printed wafer may have a side view where the first and the second thermoplastic materials may be filled from a top of the wafer to a bottom of the wafer thoroughly as shown in 804. The printed wafer may have another side view where the first and the second thermoplastic materials may be periodically and vertically filled with each other as shown in 806.

In FIG. 8B, an exemplary second printed wafer with a heterogeneous thermoplastic structure may be shown within the scope of the present disclosure. A top view of the printed wafer is illustrated in 812. A side view of the printed wafer is illustrated in 814 and 816. The printed wafer 812 may include a structure with an archery shape in which a first thermoplastic material 808 and a second thermoplastic material 810 may be connected to each other. The printed wafer may have a side view where the first and the second thermoplastic materials are filled from a top of the wafer to a bottom of the wafer thoroughly as shown in 814. The printed wafer may have another side view where the first and the second thermoplastic materials may be periodically and vertically filled with each other as shown in 816.

In FIG. 8C, an exemplary third printed wafer with a heterogeneous thermoplastic structure may be shown within the scope of the present disclosure. A top view of the printed wafer is illustrated in 818. A side view of the printed wafer is illustrated in 820. The printed wafer 818 may include a plaid structure in which a first thermoplastic material 808 and a second thermoplastic material 810 may be connected to each other. The printed wafer may have a side view where the first and the second thermoplastic materials may be periodically and vertically filled with each other as shown in 820.

The first and the second thermoplastic materials may be modified with light filters or dyes or additives or fillers. The light filters may include UV cut, blue cut filter, chrono cut filter, NIR cut filter, or the like. The dyes may include color balancing dyes, color enhancement dyes, photochromic dye, dichroic dyes, or the like. The additives may include plasticizer, heat stabilizer, light stabilizer, flow improver, mold release, or the like. The fillers may include particles, fibers, nano tubes, or the like.

In addition to the functionalities of the thermoplastic materials, the first and the second thermoplastic materials may also be selected based on the properties and the structures. The detail of the selection is shown in Table 2.

TABLE 2

| | Thermoplastic | Function layers Thermoplastic1 | Substrate layers Thermoplastic 2 | Selection criteria |
|---|---|---|---|---|
| | Chemistry | Preferred to be ones listed in Table 3 | | Thermoplastic 1 has good adhesion with Thermoplastic 2. |
| Optical properties | RI | $RI_1$ | $RI_2$ | $|RI_1-RI_2| < 0.01$, if heterogeneous pattern, to avoid light scattering |
| | L, a, b | $L_1, a_1, b_1$ | $L_2, a_2, b_2$ | $\Delta E < 1$, if heterogeneous pattern, to avoid color inhomogeneity |
| Thermo-Mechano properties | Tg Viscosity Modulus | $Tg_1$ $\eta_1$ $E_1$ | $Tg_2$ $\eta_2$ $E_2$ | One Thermoplastic is preferred to have better flowability as presented by lower Tg, or lower $\eta$, or lower E, so it can fill the voids between filaments |
| Functions | 1 2 3 4 5 6 7 8 9 | Tintable Anti fog Anti static Anti scratch Anti smudge Anti reflection Sunwear Photochromic Light filtration, e.g., blue cut, NIR cut, etc | 1. Higher mechanical integrity; and/or 2. Higher Tg; 3. Better adhesion with lens substrate | Functional layer is preferred to be the optical surface, if homogeneous pattern |

The properties, functionalities, and selection criteria of thermoplastic materials may be shown in Table 2 within the scope of the present disclosure. As mentioned earlier in paragraphs associated with FIG. 7, the first thermoplastic material may be used as a functional layer, and the second thermoplastic material may be used as a substrate layer. The first thermoplastic material may have a better adhesion than the second thermoplastic material.

As mentioned earlier and in Table 2, the refractive index (RI) difference between the first thermoplastic material and the second thermoplastic material may be less than 0.01 for a heterogeneous structure on a printed wafer in order to avoid a light scattering. The color difference ($\Delta E$) of the first and the second thermoplastic materials also may be less than 1 for the heterogeneous structure on the printed wafer in order to avoid the color inhomogeneity.

One of the thermoplastic materials may be selected due to lower glass transition temperature, lower viscosity, and lower modulus to have a better flowability. With a better flowability, the selected thermoplastic materials may fill the voids between printed patterns and filaments.

The functional layer may have one or more functions such as tintability, anti-fog, anti-static, anti-scratch, anti-smudge, anti-reflection, sunwear, photochromic, and light filtration, etc. The substrate layer may have one or more functions such as a higher mechanical integrity, a higher glass transition temperature, and a better adhesion with a lens substrate. A functional layer may be the optical surface of the product when the printed pattern is a homogeneous structure.

A list of thermoplastic materials may be listed in Table 3, which may include Polycarbonate (PC), Polyamide (PA), Thermoplastic Polyurethane (TPU), Poly(methyl methacrylate) (PMMA), Polyester, and Polysulfone (PSU). In addition, the thermoplastic materials can also be Cyclic Olefin Copolymer (COC), Cyclo Olefin Polymer (COP), etc. The thermoplastic materials may be also be modified with light filters, such as blue cut filter, chrono cut filter, NIR cut filter, etc. The thermoplastic materials may also be modified with dyes, such as color balancing dyes, color enhancement dyes, photochromic dye, dichroic dyes, etc. The thermoplastic materials may also be modified with additives such as plasticizer, heat stabilizer, light stabilizer, flow improver, mold release, etc.

TABLE 3

List of some thermoplastic candidates

| Thermoplastic | Chemistry | Trade Name | Supplier |
|---|---|---|---|
| PC | Polycarbonate, or its copolymer | Lexan Panlite Lupilon Makrolon Lupizeta | Sabic Teijin MEP Covestro MGC |
| PA | Polyamide, or its copolymer | Trogamid Grilamid Rilsan | Evonik EMS-Grivory Arkema |
| TPU | Thermoplastic Polyurethane, or its copolymer | Estane Texin | Lubrizol Covestro |
| PMMA | Poly(methyl methacrylate), or its copolymer | Acrylite, Acrymid | Evonik |

TABLE 3-continued

| List of some thermoplastic candidates | | | |
| --- | --- | --- | --- |
| Thermoplastic | Chemistry | Trade Name | Supplier |
| Polyester | Polyester, or its copolymer | Tritan | Eastman Chemical |
| | | Ecozen | SK Chemical |
| PSU | Polysulfone | Udel | Solvay |

Using the selection criteria and the thermoplastic materials described in Tables 2 and 3, a thin and a curved wafer may be produced. The printed thin and curved wafer may have one of the following properties for an ophthalmic lens application such as a high surface smoothness, e.g., the roughness value may be under 50 nm, high dimension accuracy, high surface curvature accuracy, high surface microstructure replication, minimal voids inside the printed structures, and various functionalities for the ophthalmic lens application. The various functionalities may be the functions described above such as tintability, anti-fog, anti-static, anti-scratch, anti-smudge, anti-reflection, sunwear, photochromic, and light filtration, etc. The substrate layer may have one or more functions such as a higher mechanical integrity, a higher glass transition temperature, and a better adhesion with a lens substrate.

Examples of the three-dimensional FDM printing process are described below.

Example 1 is a polycarbonate (PC) thin wafer with progressive curvature on a Convex surface.

Properties and details of the PC wafers may be shown in Table 4 within the scope of the present disclosure. Details of the optical mold and 3D printing parameters may be shown in Table 5 within the scope of the present disclosure. The optical mold 404 in FIG. 4 may be first heated up to 175° C., which may be 30° C. above the glass transition temperature of the PC. Filament of the PC is extruded and then printed onto the optical mold to form a skin layer on the optical mold layers may be printed onto the optical mold 404 at a lower temperature but still above the glass transition temperature of the PC to make sure the previous layers may be not too soft to be printed on. After the printing process, the temperature of the optical mold 404 may be decreased to 130° C., which may be slightly below the glass transition temperature of the PC to make sure that molecular chain of the PC may be fully relaxed and the internal stress may be removed to avoid warpage of the thermoplastic films. The temperature of the optical mold may be then reduced to 60° C., so the thermoplastic layers do not stick to the optical mold 404 and can be removed easily.

TABLE 4

| PC's properties and wafer's specification. | | |
| --- | --- | --- |
| Filament | Thermoplastic | Polycarbonate |
| raw | RI | 1.59 |
| material | Tg | 145° C. |
| Wafer | Thickness | 1.0  mm |
| specification | Curvature radius | 83.3  mm |
| | Cx optics design | Progressive Physio B 3.00 Add. 2.00 |

TABLE 5

| FDM 3D printing process and results of PC thin wafer with progressive curvature on Cx Convex surface. | | | |
| --- | --- | --- | --- |
| Optical mold | | Radius | 83.3  mm |
| | | Optics design | Progressive Physio B 3.00 Add. 2.00 |
| 3D printing | Skin | Nozzle temp. | 250° C. |
| parameters | layer | Mold temp | 175° C. |
| | printing | Vacuum | Yes |
| | Bulk | Nozzle temp. | 250° C. |
| | layers | Mold temp | 150° C. |
| | printing | Vacuum | Yes |
| Part annealing | | Mold temp. | 130° C. |
| | | Time | 5 minutes |
| | | Vacuum | Yes |
| Part removing | | Mold temp. | 60° C. |
| | | Vacuum | No |
| Resulting part properties | | A 1 mm thick Physio B 3.00 Add. 2.00 progressive wafer conforming to the geometrical and optical specs was produced | |

404. Vacuum may be applied once the skin layer is formed. The temperature of the optical mold 404 may be then decreased to 150° C., which may be slightly above the glass transition temperature of the PC, and the subsequent thermoplastic layers may be printed. Since the skin layer may be printed at the temperature above the glass transition temperature of the PC, and the vacuum may be applied, the optical design of the optical mold may be well replicated with high precision. The skin layer may be a layer on the surface of the thin wafer. The subsequent thermoplastic Example 2 is a polyamide (PA) thin wafer with Fresnel microstructure on Convex surface.

Properties and details of the PA wafers may be shown in Table 6 within the scope of the present disclosure. Details of the optical mold and 3D printing parameters may be shown in Table 7 within the scope of the present disclosure. The optical mold 404 may be first heated up to 160° C., which may be 20° C. above the glass transition temperature of the PA. Filament of the PA is extruded and printed to form a skin layer. The skin layer may be a layer on the surface of the thin wafer. Vacuum may be applied once the skin layer is formed. The temperature of the optical mold may be then decreased to 140° C., which may be the same as the glass transition temperature of the PA, and the subsequent thermoplastic layers may be printed. Since the skin layer may be printed at a temperature above the glass transition temperature of the PA, and the vacuum may be applied, the optical mold's Fresnel microstructure design may be well replicated with a high precision. The thermoplastic layers may be printed onto the optical mold at a lower temperature but equals to the glass transition temperature of the PA to ensure the previous layers are not difficult to be printed on. After the printing process is completed, the temperature of the optical mold 404 may be kept at 120° C., which may be slightly lower than the glass transition temperature of the PA to make sure that the molecular chain of the PA may be fully relaxed and the internal stress may be removed to avoid any warpage of the thermoplastic layers or films. The temperature of the optical mold 404 may be finally decreased to 60° C., so the thermoplastic layers or films do not stick to the mold and may be removed easily.

TABLE 6

PA's properties and wafer specification.

| Filament raw material | Thermoplastic RI | Polyamide 1.52 |
|---|---|---|
| | Tg | 140° C. |
| Wafer specification | Thickness | 1.0 mm |
| | Curvature radius | 75 mm |
| | Cx microstructure | Fresnel microstructure |
| | Optics power | −4.00D spheric |

TABLE 7

FDM 3D printing process and results of PA thin wafer with Fresnel microstructure on Cx surface.

| Optical Mold | | Radius | 75 mm |
|---|---|---|---|
| | | microstructure design | Fresnel microstructure |
| Printing parameters | Step 1 | Nozzle temperature | 300° C. |
| | | Mold temperature | 160° C. |
| | | Vacuum | Yes |
| | Step 2 | Nozzle temperature | 300° C. |
| | | Mold temperature | 140° C. |
| | | Vacuum | Yes |
| Part annealing | | Mold temperature | 120° C. |
| | | Time | 4 minute |
| | | Vacuum | Yes |
| Part removing | | Mold temperature | 60° C. |
| | | Vacuum | No |
| Resulting part properties | | A 1 mm thick Fresnel wafer with −4.00D optical power, conforming to the geometrical and optical specification and with high microstructure replication quality was produced. | |

Example 3 is a Copolyester/PC thin spherical wafer with tintability.

A thin spherical wafer that is tintable may be printed using Copolyester and PC as raw materials. Copolyester may be selected as a functional layer on the front surface of the thin spherical wafer due to its tintability. The PC may be selected as a substrate layer on the back surface of the thin spherical wafer due to the higher glass transition temperature and a higher mechanical strength. The properties of the thermoplastic materials and the specification of the optical mold may be shown in Table 8 within the scope of the present disclosure.

TABLE 8

PC and Copolyester's properties and wafer specification.

| Thermoplastic's optical properties | Thermoplastic 1 | Copolyester |
|---|---|---|
| | $RI_1$ | 1.56 |
| | $Tg_1$ | 113° C. |
| | Thermoplastic 2 | Polycarbonate |
| | $RI_2$ | 1.59 |
| | $Tg_2$ | 145° C. |
| Thermoplastic's role | Thermoplastic 1 | Function layer, with tintability |
| | Thermoplastic 2 | Substrate layer, with higher Tg and higher mechanical strength |
| Wafer optics specification | Thickness | 1.0 mm |
| | Curvature radius | 75 mm |
| | Optics power | 0.00D spheric |
| | Wafer function | Tintable |

Figure 9:
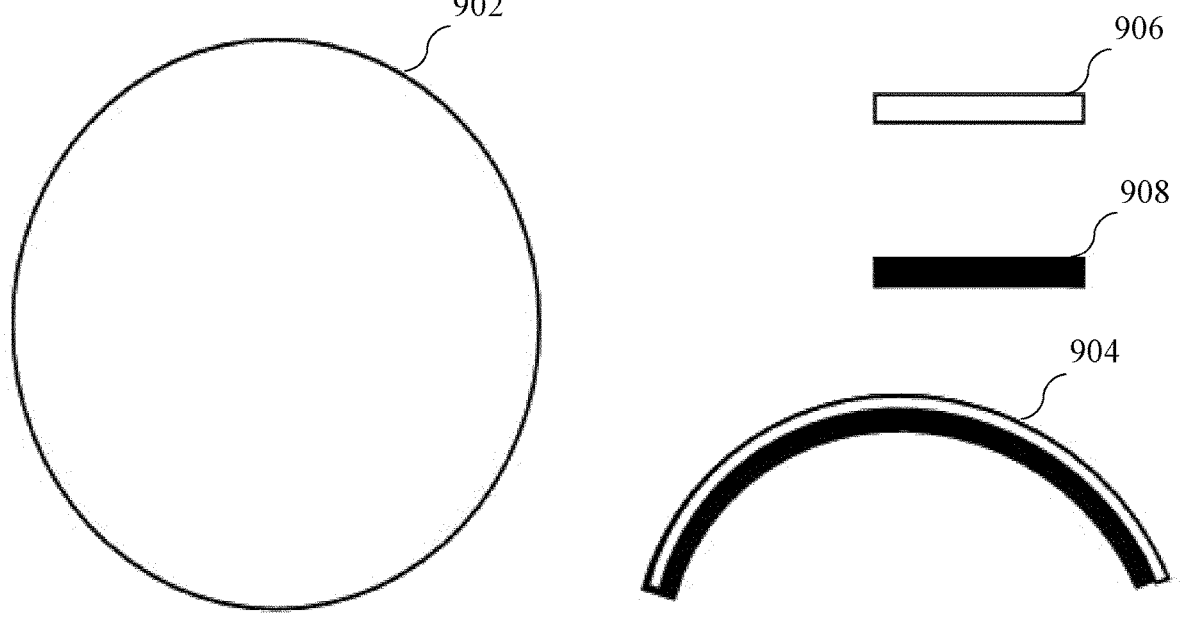
FIG. 9 is a printed Copolyester/polycarbonate (PC) thin spherical wafer, within the scope of the present disclosure.

The printed Copolyester/PC thin spherical wafer may be shown in FIG. 9 within the scope of the present disclosure. A top view of the printed wafer is illustrated in 902. A side view of the printed wafer is illustrated in 904. The printed wafer 902 may include a top layer, or a skin layer, made by Copolyester 906 and a bottom layer, or a substrate layer, made by PC 908. The printed wafer may have a same curvature as the ophthalmic lens so that the printed wafer may stay on the ophthalmic lens.

A 3D FDM printing process and results of Copolyester/PC thin wafer with tintability may be shown in Table 9 within the scope of the present disclosure. For example, in Table 9, each temperature of the nozzle and optical mold of using Copolyester as a skin layer and using the PC as a substrate layer is listed. In addition, the temperature for annealing and removing the part, e.g., the thermoplastic layer, is also shown in Table 9.

TABLE 9

| FDM 3D printing process and results of Copolyester/PC thin wafer with tintability. | | | |
|---|---|---|---|
| Optical | | Radius | 75 mm |
| Mold | | Optics design | Spheric |
| Printing | Copolyester | Nozzle | 250° C. |
| parameters | as skin layer | temperature | |
| | | Mold | 143° C. |
| | | temperature | |
| | | Vacuum | Yes |
| | PC as | Nozzle | 300° C. |
| | substrate layer | temperature | |
| | | Mold | 103° C. |
| | | temperature | |
| | | Vacuum | Yes |
| Part annealing | | Mold temperature | 100° C. |
| | | Time | 4 minute |
| | | Vacuum | Yes |
| Part removing | | Mold temperature | 60° C. |
| | | Vacuum | No |
| Resulting part properties | | A tintable 1 mm thick spheric wafer with 75 mm radius conforming to geometry and optical specification was produced. | |

Example 4 is a Thermoplastic Polyurethane (TPU)/PC thin wafer with high clarity and high strength. The TPU/PC thin wafer may have other functions such as photochromic and light filtration, etc.

A thin flat wafer with high clarity and high strength may be printed using TPU and PC as raw materials. TPU is selected as a functional layer that may fill the voids between PC filaments due to the lower glass transition temperature and a good adhesion to PC. The PC may be selected as a substrate layer due to the higher glass transition temperature and a higher mechanical strength. The refractive index difference between these two thermoplastic materials may be less than 0.01, so there may be no light scattering between the two thermoplastic filaments. The properties and the specification of the optical mold may be shown in Table 10 within the scope of the present disclosure. The printed thin flat wafer may be shown in FIG. 10 within the scope of the present disclosure.

TABLE 10

| TPU and PC'S properties and wafer specification. | | |
|---|---|---|
| Thermoplastic's | Thermoplastic 1 | TPU |
| optical | $RI_1$ | 1.59 |
| properties | $Tg_1$ | 90° C. |
| | Thermoplastic 2 | Polycarbonate |
| | $RI_2$ | 1.59 |
| | $Tg_2$ | 145° C. |
| Thermoplastic's | Thermoplastic 1 | TPU filament can fill the voids between PC filaments, due to its lower Tg and good adhesion to PC. The wafer thus has higher clarity and higher strength |
| role | Thermoplastic 2 | Substrate layer, with higher Tg and higher mechanical strength |
| Water | Thickness | 1.0 mm |
| optics | Curvature radius | flat |
| specification | Optics power | 0.00D |

Figure 10:
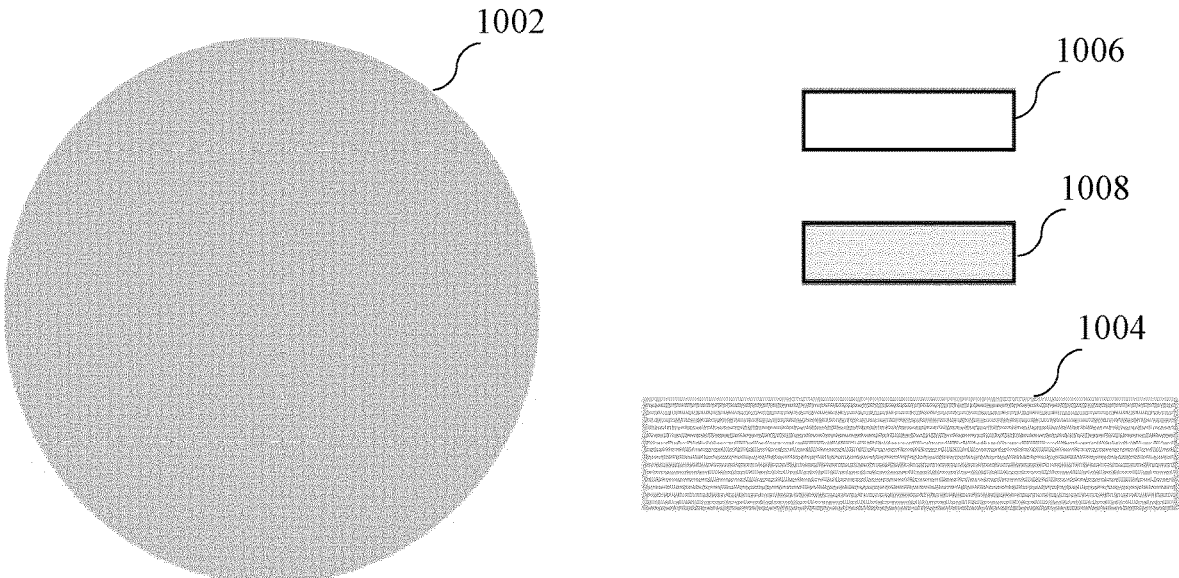
FIG. 10 is a printed TPU and PC thin spherical wafer, within the scope of the present disclosure.

The printed TPU/PC thin flat wafer may be shown in FIG. 10 within the scope of the present disclosure. A top view of the printed wafer is illustrated in 1002. A side view of the printed wafer is illustrated in 1004. The printed wafer 1002 may include a top layer, or a skin layer, made by TPU 1006 and a bottom layer, or a substrate layer, made by the PC 1008.

As listed in Table 11, the printed wafer may be a 1 mm thick flat wafer produced by TPU and PC. The wafer may have a high transparency, e.g., Tv % (D65)>80% at 1 mm, where Tv % (D65) may be the total visible light transmission, which may be measured under D65 illuminant as defined by International Commission on Illumination (CIE), and high mechanical strength, e.g., the impact strength >60 J/m (notched izod, 23° C., as defined by ASTM D256). The wafer may have other functions such as photochromic and light filtration. The light filtration may be made by adding photochromic dye into TPU layer, and adding light filter into TPU, and/or PC layer. For example, in Table 11, each temperature of the nozzle and optical mold of using TPU as a skin layer and using the PC as a substrate layer may be listed. In addition, the temperature for annealing and removing the part, e.g., the thermoplastic layer, may be also shown in Table 11 within the scope of the present disclosure.

perature control circuitry, the temperature of the optical mold to a third temperature, annealing the first layer and the second layer once the temperature of the optical mold has reached the third temperature, and removing the vacuum from the optical mold permitting removal of the thermoplastic film including the annealed first layer and the annealed second layer from the optical mold.

(2) The method according to (1), wherein the first temperature is between 10° C. lower than a glass transition temperature of the thermoplastic film and 30° C. higher than the glass transition temperature, e.g., 5° C. lower than a glass transition temperature of the thermoplastic film and 20° C. higher than the glass transition, 5° C. lower than a glass transition temperature of the thermoplastic film and 10° C. higher than the glass transition, or 1° C. lower than a glass transition temperature of the thermoplastic film and 1° C. higher than the glass transition.

(3) The method according to (1), wherein the first layer of the thermoplastic film is a thermoplastic skin layer including a plurality of thermoplastic layers, and wherein a thickness of the first layer of the thermo-

TABLE 11

| FDM 3D printing process and results of TPU/PC thin wafer with high clarity and high strength. | | | |
|---|---|---|---|
| Optical Mold | | Radius | flat |
| Printing parameters | TPU as function layer | Nozzle temperature | 240° C. |
| | | Mold temperature | 100° C. |
| | | Vacuum | Yes |
| | PC as substrate layer | Nozzle temperature | 300° C. |
| | | Mold temperature | 165° C. |
| | | Vacuum | Yes |
| Part annealing | | Mold temperature | 100° C. |
| | | Time | 4 minute |
| | | Vacuum | Yes |
| Part removing | | Mold temperature | 60° C. |
| | | Vacuum | No |
| Resulting part properties | A 1 mm thick flat wafer, with high transparency Tv % (D65) >80% @ 1 mm, and high impact strength strength >60 J/m (notched izod, 23° C.) was produced | | |

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method of printing a thermoplastic film on an optical mold, comprising adjusting, by temperature control circuitry, a temperature of the optical mold to a first temperature, printing a first layer of the thermoplastic film on the optical mold once the temperature of the optical mold has reached the first temperature, applying a vacuum to the optical mold to hold the thermoplastic film on the optical mold, adjusting, by the temperature control circuitry, the temperature of the optical mold to a second temperature, printing a second layer of the thermoplastic film on the first layer of the thermoplastic film once the temperature of the optical mold has reached the second temperature, adjusting, by the templastic film is between 10 and 500 microns, e.g., 20, 30, 40, 50, 60, 70, 80, 90, 100, 200, 300, 400, or 450 microns.

(4) The method according to (1), wherein the second temperature is equal or greater than the glass transition temperature.

(5) The method according to (1), wherein the third temperature is between the glass transition temperature and 60° C. lower than the glass transition temperature.

(6) The method according to (1), wherein the temperature control circuitry controls one or more electric heating elements and/or a microfluidic channel circulating with a temperature regulating fluid to regulate the temperature of the optical mold.

(7) The method according to (1), wherein the printing the first layer or printing the second layer includes printing using a single thermoplastic or at least two different thermoplastics to form 2D or 3D structures and/or functions.

(8) The method according to any one of (1) and (7), wherein at least one of the at least two different thermoplastics has a higher mechanical strength than another one of the at least two different thermoplastics and/or at least one of the at least two different thermoplastics has a higher glass transition temperature than another one of the at least two different thermoplastics.

(9) The method according to any one of (1) and (7), wherein the at least two different thermoplastics form a homogenous or heterogeneous structures and/or functions.

(10) The method according to any one of (1), (7), and (9), wherein the at least two different thermoplastics form a heterogeneous structures and/or function, wherein a difference of refractive index (RI) between different thermoplastics is less than 0.01, 0.005, or 0.001 and/or wherein ΔE between different thermoplastics is less than 1, 0.5, 0.3, 0.2, 0.1, where $$\Delta E = \sqrt{(\Delta L)^2 + (\Delta a^*)^2 + (\Delta b^*)^2},$$

as defined by CIE76 formula.

(11) The method according to any one of (1) and (7), wherein the at least two different thermoplastics are modifiable with light filters or dyes or additives or fillers.

(12) The method according to any one of (1), (7), and (11), wherein the light filters include one from a group consisting of UV cut, blue cut filter, and NIR cut filter, wherein the dyes include one from a group consisting of color balancing dyes, color enhancement dyes, photochromic dye, and dichroic dyes, wherein the additives include one from a group consisting of plasticizer, heat stabilizer, light stabilizer, flow improver, and mold release, and wherein the fillers include one from a group consisting of particles, fibers, and nano tubes.

(13) A thermoplastic film of an ophthalmic lens formed on an optical mold, comprising a first layer of the thermoplastic film formed on the optical mold, wherein a temperature of the optical mold is adjusted to a first temperature during the formation of the first layer of the thermoplastic film, and a second layer of the thermoplastic film formed on the first layer, wherein the temperature of the optical mold is adjusted to a second temperature during the formation of the second layer of the thermoplastic film.

(14) The thermoplastic film of an ophthalmic lens according to (13), further comprising one or more of optical surface features including spheric, aspheric, bifocal, trifocal, progressive, microlenses, Fresnel structures, and moth-eye structures.

(15) An optical mold structure for forming a thermoplastic film, comprising temperature control circuitry, the temperature control circuitry controlling one or more electric heating elements and/or a microfluidic channel, an optical mold on the temperature control circuitry for forming a first layer and a second layer of the thermoplastic film, wherein the optical mold further comprising one or more of optical surface features including spheric, aspheric, bifocal, trifocal, progressive, microlenses, Fresnel structures, and moth-eye structures, and a vacuum attaching to the optical mold for holding the thermoplastic film on the optical mold.

By providing the features of the disclosure, it is possible to print thermoplastic layers or films using the optical mold which is controlled by the temperature control unit. This is different with the prior systems since the temperature of the prior systems cannot be controlled so the quality of thermoplastic layers or films is lower.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of printing a thermoplastic film on an optical mold, comprising:

adjusting, by temperature control circuitry, a temperature of the optical mold to a first temperature;

printing a first layer of the thermoplastic film on the optical mold once the temperature of the optical mold has reached the first temperature;

applying, right after printing of the first layer, a vacuum to the optical mold to hold the thermoplastic film on the optical mold and deform the thermoplastic film to conform to a curvature or microstructures of a surface of the optical mold;

adjusting, by the temperature control circuitry, the temperature of the optical mold to a second temperature;

printing a second layer of the thermoplastic film on the first layer of the thermoplastic film once the temperature of the optical mold has reached the second temperature;

adjusting, by the temperature control circuitry, the temperature of the optical mold to a third temperature;

annealing the first layer and the second layer once the temperature of the optical mold has reached the third temperature; and removing the vacuum from the optical mold permitting removal of the thermoplastic film including the annealed first layer and the annealed second layer from the optical mold.

2. The method according to claim 1, wherein the first temperature is between 10° C. lower than a glass transition temperature of the thermoplastic film and 30° C. higher than the glass transition temperature of the thermoplastic material of the first layer.

3. The method according to claim 1, wherein the first layer of the thermoplastic film is a thermoplastic skin layer including a plurality of thermoplastic layers, and wherein a thickness of the first layer of the thermoplastic film is between 10 and 500 microns.

4. The method according to claim 1, wherein the second temperature is equal to or greater than the glass transition temperature of the thermoplastic material of the second layer.

5. The method according to claim 1, wherein the third temperature is between the glass transition temperature and 60° C. lower than the glass transition temperature of the thermoplastic material of the second layer.

6. The method according to claim 1, wherein the temperature control circuitry controls one or more electric heating elements and/or a microfluidic channel circulating with a temperature regulating fluid to regulate the temperature of the optical mold.

7. The method according to claim 1, wherein the printing the first layer or printing the second layer includes printing using a single thermoplastic or at least two different thermoplastics to form 2D or 3D structures and/or functions.

8. The method according to claim 7, wherein at least one of the at least two different thermoplastics has a higher mechanical strength than another one of the at least two different thermoplastics and/or at least one of the at least two different thermoplastics has a higher glass transition temperature than another one of the at least two different thermoplastics.

9. The method according to claim 7, wherein the at least two different thermoplastics form a homogenous or heterogeneous structures and/or functions.

10. The method according to claim 7, wherein the at least two different thermoplastics form a heterogeneous structure and/or function, wherein a difference of refractive index (RI) between different thermoplastics is less than 0.01 and/or wherein ΔE between different thermoplastics is less than 1, where $\Delta E = \sqrt{(\Delta L)^2 + (\Delta a^*)^2 + (\Delta b^*)^2}$, as defined by CIE76 formula.

11. The method according to claim 7, wherein the at least two different thermoplastics are modifiable with light filters or dyes or additives or fillers.

12. The method according to claim 11, wherein:

the light filters include one from a group consisting of UV cut, blue cut filter, and NIR cut filter;

the dyes include one from a group consisting of color balancing dyes, color enhancement dyes, photochromic dye, and dichroic dyes;

the additives include one from a group consisting of plasticizer, heat stabilizer, light stabilizer, flow improver, and mold release; and the fillers include one from a group consisting of particles, fibers, and nano tubes.

* * * * *